(12) United States Patent
Odera et al.

(10) Patent No.: US 11,703,403 B2
(45) Date of Patent: Jul. 18, 2023

(54) TORQUE MEASUREMENT DEVICE

(71) Applicant: NSK LTD., Tokyo (JP)

(72) Inventors: Takahiro Odera, Fukuroi (JP); Junji Ono, Fujisawa (JP); Masahiro Kobayashi, Fukuroi (JP); Kota Fukuda, Fukuroi (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 17/788,447

(22) PCT Filed: Jul. 1, 2021

(86) PCT No.: PCT/JP2021/025003
§ 371 (c)(1),
(2) Date: Jun. 23, 2022

(87) PCT Pub. No.: WO2022/059295
PCT Pub. Date: Mar. 24, 2022

(65) Prior Publication Data
US 2023/0037362 A1 Feb. 9, 2023

(30) Foreign Application Priority Data
Sep. 16, 2020 (JP) ................................. 2020-155206

(51) Int. Cl.
*G01L 3/00* (2006.01)
*G01L 3/10* (2006.01)
(52) U.S. Cl.
CPC ...................................... *G01L 3/10* (2013.01)
(58) Field of Classification Search
CPC ...................................................... G01L 3/10
See application file for complete search history.

(56) References Cited

U.S. PATENT DOCUMENTS 5,255,567 A * 10/1993 Miyake .................. G01L 3/105
73/862.333
8,672,086 B2 * 3/2014 Wong ....................... B62D 6/10
180/443

(Continued)

FOREIGN PATENT DOCUMENTS

JP 59-061730 A 4/1984
JP 4-47638 U 4/1992

(Continued)

OTHER PUBLICATIONS

International Search Report for PCT/JP2021/025003 dated Aug. 10, 2021 [PCT/ISA/210].

(Continued)

*Primary Examiner* — Max H Noori
(74) *Attorney, Agent, or Firm* — Sughrue Mion, PLLC

(57) ABSTRACT

A torque measurement device includes a case that does not rotate even during use; a rotating shaft rotatably supported to the case and having a magnetostrictive effect part whose magnetic permeability changes according to a transmitted torque; and a magnetostrictive sensor having a detection part arranged closely adjacent to the magnetostrictive effect part so that a voltage changes according to change of the magnetic permeability of the magnetostrictive effect part, and being supported to the case; and the torque measurement device has a rotation-preventing construction configured to prevent the magnetostrictive sensor from rotating with respect to the case.

6 Claims, 11 Drawing Sheets

(56) References Cited

U.S. PATENT DOCUMENTS

| | | | |
|---|---|---|---|
| 2004/0187606 A1* | 9/2004 | Nehl | G01L 3/102 |
| | | | 73/862.333 |
| 2010/0232161 A1* | 9/2010 | Aschwanden | G02B 7/04 |
| | | | 359/666 |
| 2013/0118273 A1* | 5/2013 | Antoni | G01D 5/145 |
| | | | 73/862.08 |
| 2016/0310157 A1* | 10/2016 | Guiles | B21G 1/08 |
| 2018/0010971 A1 | 1/2018 | Hill et al. | |
| 2019/0118861 A1* | 4/2019 | Jaekel | G01L 5/221 |

FOREIGN PATENT DOCUMENTS

| | | | |
|---|---|---|---|
| JP | 8-001465 Y2 | 1/1996 | |
| JP | 2017-15426 A | 1/2017 | |

OTHER PUBLICATIONS

JPO Office Action for Application No. 2021-568635 dated Feb. 8, 2022.

* cited by examiner

TORQUE MEASUREMENT DEVICE

CROSS REFERENCE TO RELATED APPLICATIONS

This application is a National Stage of International Application No. PCT/JP2021/025003, filed on Jul. 1, 2021, which claims priority from Japanese Patent Application No. 2020-155206, filed on Sep. 16, 2020.

TECHNICAL FIELD

The present invention relates to a torque measurement device for measuring a torque transmitted by a rotating shaft.

BACKGROUND ART

In recent years, in the field of automobiles, the development of a system in which a torque transmitted by a rotating shaft of a power train (power transmission mechanism) is measured, and the measurement result is used for controlling output of a power source such as an engine and an electric motor, and controlling gear shifting of a transmission, has been progressing.

Conventionally, as a means for measuring a torque transmitted by a rotating shaft, a magnetostrictive torque measurement device is known. As described in JP 59-061730 (A), for example, the magnetostrictive torque measurement device includes a magnetostrictive material fixed to the outer circumferential surface of a rotating shaft, and a magnetostrictive sensor arranged in the vicinity of the magnetostrictive material for detecting change of the magnetic permeability of the magnetostrictive material. When a torque is applied to the rotating shaft, the magnetostrictive material undergoes elastic torsional deformation, and thus change occurs in the magnetic permeability of the magnetostrictive material due to a reverse magnetostrictive effect. As a result, because the output signal of the magnetostrictive sensor changes according to the change of the magnetic permeability of the magnetostrictive material, a torque transmitted by the rotating shaft can be measured.

CITATION LIST

Patent Literature

[Patent Literature 1] JP 59-061730(A)

SUMMARY OF INVENTION

Technical Problem

In conventional magnetostrictive torque measurement devices, there is a possibility that the magnetostrictive sensor arranged in the vicinity of the magnetostrictive material rotates with respect to a case supporting the magnetostrictive sensor, resulting in occurrence of a torque measurement error.

An object of the present invention is to provide a torque measurement device having a structure capable of preventing a magnetostrictive sensor supported by a case from rotating with respect to the case.

Solution to Problem

A torque measurement device of one aspect of the present invention includes a case that does not rotate even during use; a rotating shaft that is rotatably supported to the case and has a magnetostrictive effect part whose magnetic permeability changes according to a transmitted torque; and a magnetostrictive sensor having a detection part that is arranged closely adjacent to the magnetostrictive effect part so that a voltage changes according to change of the magnetic permeability of the magnetostrictive effect part, and being supported to the case.

Particularly, the torque measurement device of one aspect of the present invention has a rotation-preventing construction configured to prevent the magnetostrictive sensor from rotating with respect to the case.

The torque measurement device of one aspect of the present invention further includes an outer ring that is arranged in the vicinity of the rotating shaft and is internally fitted to the case. In addition, the magnetostrictive sensor is supported to the case by way of the outer ring.

In this case, a configuration may be adopted which includes a rolling bearing that is constituted by including the outer ring, and that supports the rotating shaft so that the rotating shaft is able to rotate freely with respect to the case.

Alternatively, a configuration may be adopted which includes a one-way clutch that is constituted by including the outer ring, and is configured to allow rotation of the rotating shaft with respect to the case in a specified direction, and prevent rotation of the rotating shaft with respect to the case in an opposite direction to the specified direction.

In the torque measurement device of one aspect of the present invention, the rotation-preventing construction is constituted by engaging a convex portion protruding from a portion in a circumferential direction of the magnetostrictive sensor toward an outer side in a radial direction with a portion of the case.

In this case, in the torque measurement device of one aspect of the present invention, the portion of the case is a groove that is provided in an inner circumferential surface of the case and extends in an axial direction, and an end portion of a harness is connected to a side surface in the axial direction of the convex portion and a portion of the harness is arranged inside the groove.

In the torque measurement device of one aspect of the present invention, the rotation-preventing construction is constituted by engaging a convex portion protruding from a portion in a circumferential direction of the outer ring toward an outer side in a radial direction with a portion of the case.

In the torque measurement device of one aspect of the present invention, the rotation-preventing construction is constituted by fitting an outer circumferential surface of the outer ring to an inner circumferential surface of the case by non-circular fitting.

Effect of Invention

With one aspect of the present invention, it is possible to provide a torque measurement device having a structure capable of preventing a magnetostrictive sensor supported by a case from rotating with respect to the case.

DESCRIPTION OF EMBODIMENTS

First Example

Figure 1:
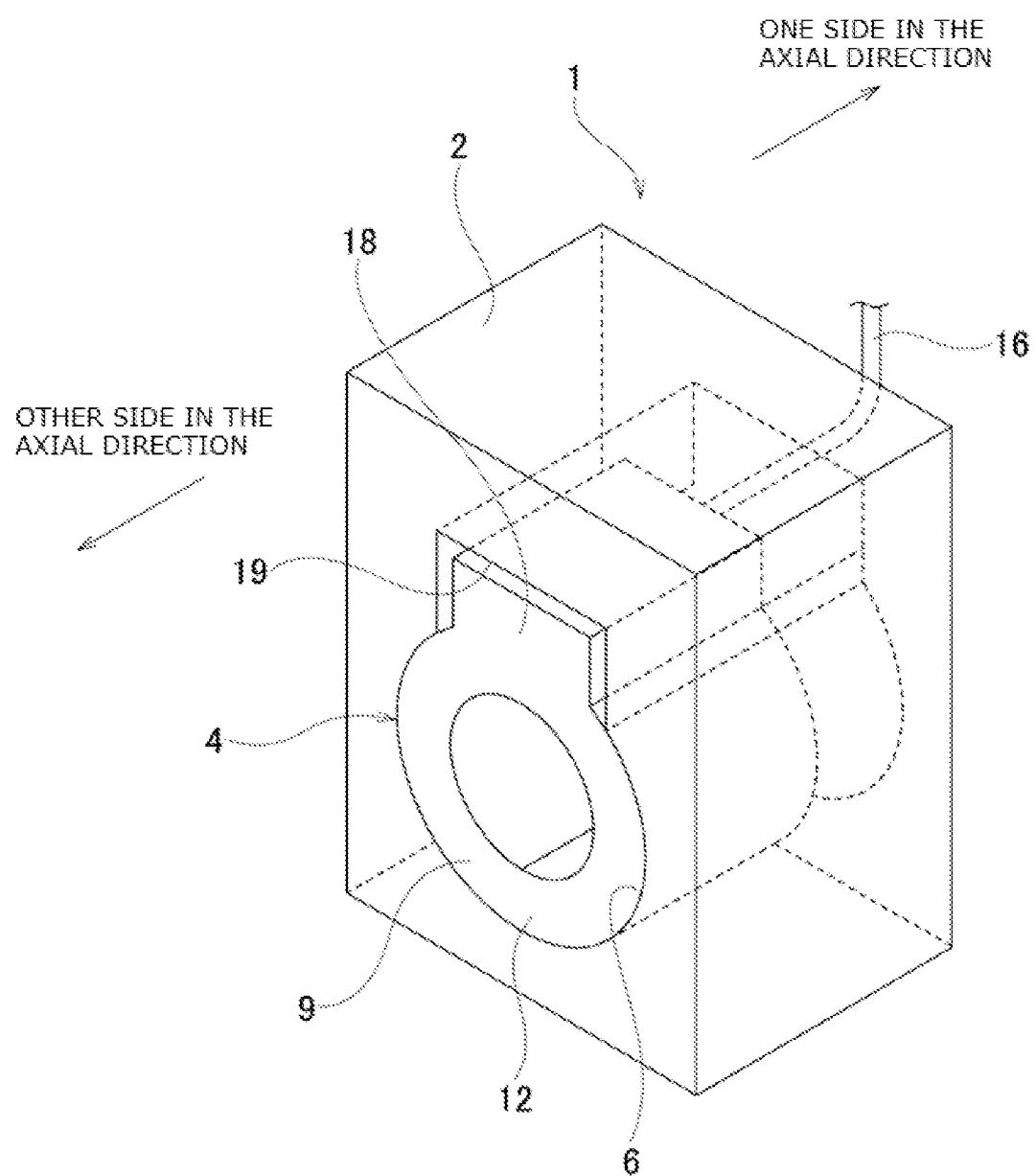
FIG. 1 is a perspective view illustrating a torque measurement device of a first example of an embodiment of the present invention, in which a rotating shaft is omitted.

A torque measurement device of a first example of an embodiment of the present invention will be described with reference to FIGS. 1 to 3.

A torque measurement device 1 of this example is a device for measuring a torque transmitted by a rotating shaft 3, and can be used by being incorporated in various types of mechanical devices. Specific examples of mechanical devices in which the torque measurement device 1 of this example is to be incorporated include a mechanical device constituting a power train of an automobile, for example, a transmission where shifting is done by vehicle-side control such as an automatic transmission (AT), a belt type continuously variable transmission, a toroidal type continuously variable transmission, an automatic manual transmission (AMT), dual clutch transmission (DCT), and a transfer, a manual transmission (MT), and the like. Note that a drive system of the targeted vehicle, that is, a system such as FF, FR, MR, RR, 4WD and the like is not particularly limited. The specific examples of mechanical devices in which the torque measurement device 1 of this example is to be incorporated also include a speed reducer, a speed increaser, and the like, of a windmill, a railway vehicle, a steel rolling mill, and the like.

The torque measurement device 1 of this example includes a case 2, the rotating shaft 3, and a magnetostrictive sensor 4. In addition, the torque measurement device 1 has a rotation-preventing construction for preventing the magnetostrictive sensor 4 from rotating with respect to the case 2. In this example, the rotation-preventing construction is constituted by engaging a convex portion 18 protruding from a portion in the circumferential direction of the magnetostrictive sensor 4 toward the outer side in the radial direction with a portion of the case 2.

Figure 2:
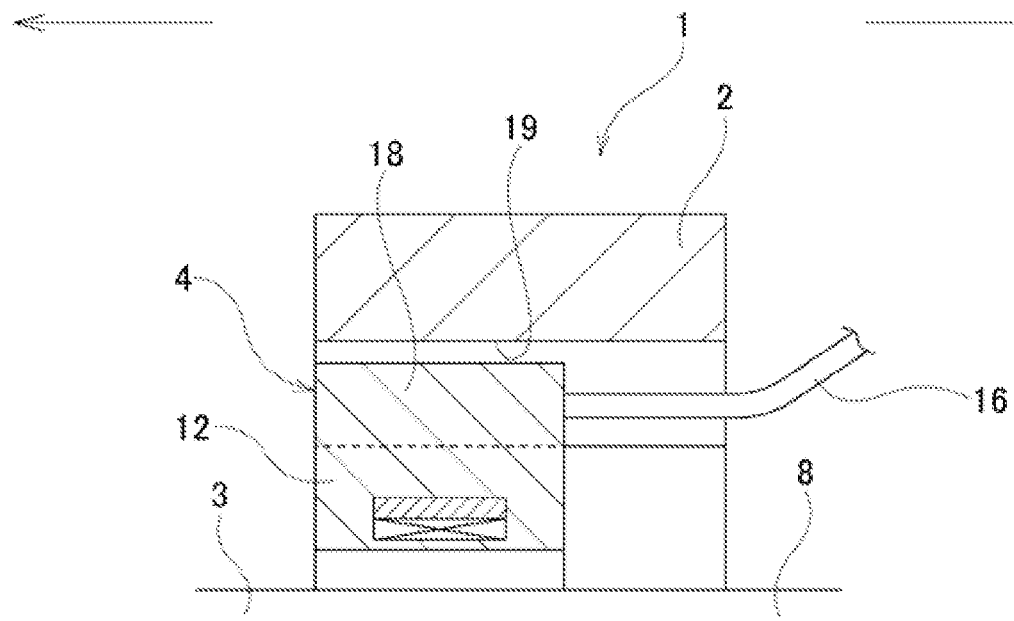
FIG. 2 is a cross-sectional view illustrating the torque measurement device of the first example.
Figure 2:
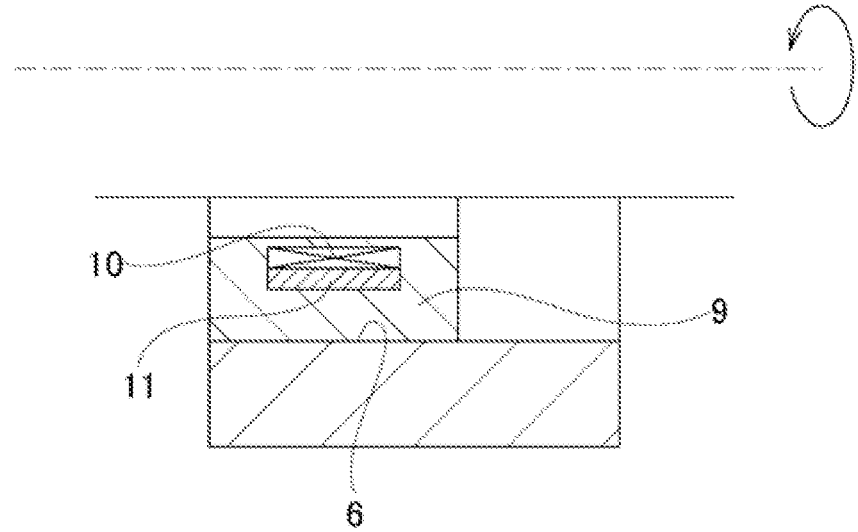

Unless specified otherwise, in regard to the torque measurement device 1, an axial direction refers to the axial direction of the rotating shaft 3, that is, the left-right direction in FIG. 2. In addition, one side in the axial direction is the right side in FIG. 2, and the other side in the axial direction is the left side in FIG. 2.

The case 2 does not rotate even during use. The case 2 has an inner circumferential surface 6 which is configured by a cylindrical surface extending in the axial direction. In addition, the case 2 has a groove 19 extending in the axial direction on one position in the circumferential direction of the inner circumferential surface 6 over the entire length in the axial direction. In the illustrated example, the groove 19 has a rectangular end surface shape when viewed in the axial direction.

The rotating shaft 3 is rotatably supported to the case 2 so as to transmit a torque during use, and has a magnetostrictive effect part whose magnetic permeability changes according to the transmitted torque.

The rotating shaft 3 is inserted through a center hole defined by the inner circumferential surface 6 of the case 2, and is arranged coaxially with the inner circumferential surface 6. In this state, the rotating shaft 3 is rotatably supported to the case 2 by way of a rolling bearing (not shown). The outer circumferential surface of an intermediate shaft portion 8 illustrated in FIG. 2, which constitutes an intermediate portion in the axial direction of the rotating shaft 3, is configured by a cylindrical surface.

In this example, because the rotating shaft 3 is made of magnetic metal, the intermediate shaft portion 8 of the rotating shaft 3 functions as the magnetostrictive effect part. As magnetic metal of the rotating shaft 3, for example, various types of magnetic steel such as carburization steel such as SCr420 and SCM420, carbon steel such as S45C, which are regulated by JIS, and the like, may be used.

When a torque is applied to the rotating shaft 3, the intermediate shaft portion 8 undergoes torsional deformation, and thus the intermediate shaft portion 8 receives a stress corresponding to the torque, that is, a tensile stress in a direction of 45 degrees with respect to the axial direction and a compressive stress in a direction of −45 degrees with respect to the axial direction. Accompanying this, due to a reverse magnetostrictive effect, magnetic permeability in each direction of the intermediate shaft portion 8 changes.

When embodying the present invention, a compression-hardened layer may also be formed by performing shot peening to a portion of the outer circumferential surface of the intermediate shaft portion 8 that faces a coil 10 (detection part of the magnetostrictive sensor 4) so as to improve mechanical characteristics and magnetic characteristics of the portion. In this way, sensitivity and hysteresis in torque measurement by the magnetostrictive sensor 4 can be improved.

When embodying the present invention, without the intermediate shaft portion 8 per se functioning as the magnetostrictive effect part, a magnetostrictive material functioning as the magnetostrictive effect part, which is separate from the intermediate shaft portion 8, may be fixed to the outer circumferential surface of the intermediate shaft portion 8. For example, the magnetostrictive material having an annular shape may be externally fitted and fixed to the intermediate shaft portion 8, or the magnetostrictive material having a shape of a coating such as a plating or a film may be fixed to the outer circumferential surface of the intermediate shaft portion 8.

The magnetostrictive sensor 4 has a detection part which is arranged closely adjacent to the magnetostrictive effect part of the rotating shaft 3, and is supported by the case. A voltage of the detection part changes according to change of the magnetic permeability of the magnetostrictive effect part.

The magnetostrictive sensor 4 includes a holder 9, the coil 10 (detection part), and a back yoke 11.

The holder 9 is integrally made of synthetic resin as a whole, and has a main body 12 and the convex portion 18. The main body 12 is configured in a cylindrical shape. The convex portion 18 protrudes from one position in the circumferential direction of the main body 12 toward the outer side in the radial direction. In this example, the convex portion 18 is provided in the main body 12 over the entire length in the axial direction. However, when embodying the present invention, the convex portion may be provided only in a portion in the axial direction of one position in the circumferential direction of the main body. In the illustrated example, the convex portion 18 has a rectangular end surface shape when viewed in the axial direction. In this example, the end portion of a harness 16 for obtaining the voltage signal of the coil 10 of the magnetostrictive sensor 4 is connected to the side surface in the axial direction of the convex portion 18, specifically, the side surface on the one side in the axial direction of the convex portion 18.

The coil 10 is configured in a cylindrical shape as a whole. The coil 10 is embedded in the main body 12 of the holder 9 and is arranged coaxially with the main body 12. During use, an AC voltage is applied to the coil 10 to generate an AC magnetic field around the coil 10.

The back yoke 11 is a member constituting a magnetic path for a magnetic flux generated by the coil 10, and is made of a magnetic material such as mild steel and configured in a cylindrical shape as a whole. The back yoke 11 is arranged so as to be externally fitted to the coil 10, and is embedded in the main body 12 of the holder 9.

The magnetostrictive sensor 4 is internally fitted to and held by the inner circumferential surface 6 of the case 2. Specifically, in this state, the main body 12 of the holder 9 is internally fitted to a portion on the other side in the axial direction of the inner circumferential surface 6 of the case 2 without looseness in the radial direction. In addition, the convex portion 18 of the holder 9 engages with a portion on the other side in the axial direction of the groove 19 of the case 2. That is, in this example, the rotation-preventing construction is constituted by engaging the convex portion 18 with the groove 19, which is a portion of the case 2. Due to this, the magnetostrictive sensor 4 is positioned with respect to the case 2 in the rotation direction, and is prevented from rotating with respect to the case 2.

Figure 3:
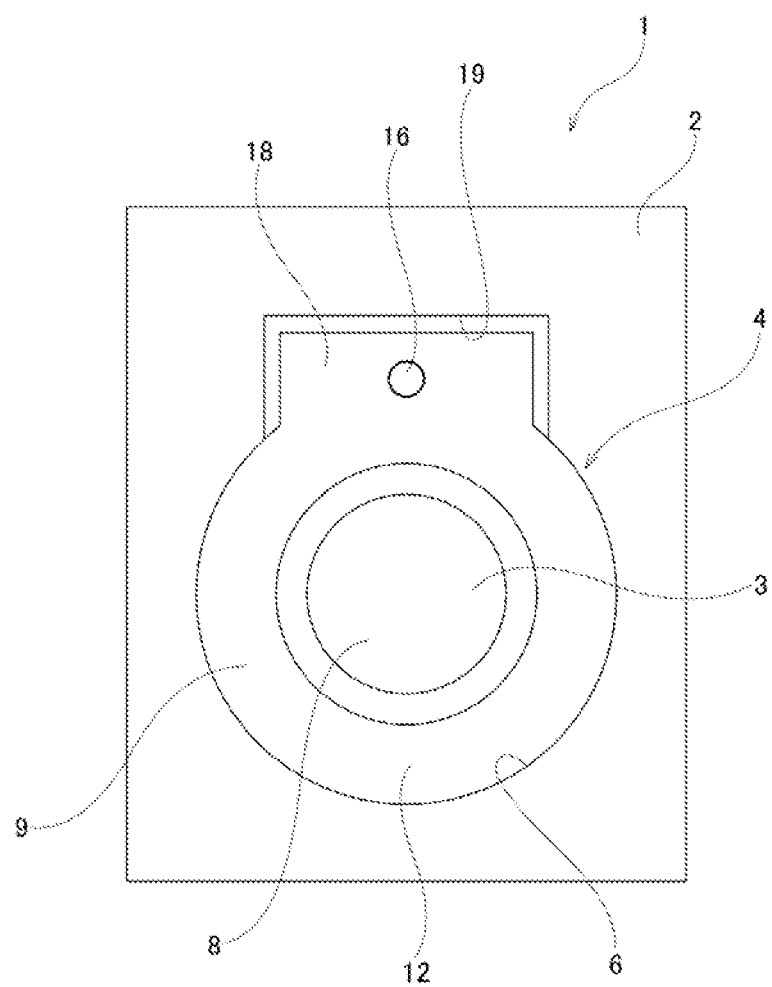
FIG. 3 is a view of the torque measurement device of the first example as viewed from one side in the axial direction.

In this example, as illustrated in FIGS. 1 and 3, the width dimension in the circumferential direction of the groove 19 is a little larger than that of the convex portion 18, and thus there is a gap in the circumferential direction between the inside surfaces on both sides in the circumferential direction of the groove 19, which constitute the inner surface of the groove 19, and the side surfaces on both sides in the circumferential direction of the convex portion 18. Therefore, in this example, existence of such a gap in the circumferential direction makes it easy to insert the convex portion 18 into the inside of the groove 19 in the axial direction. However, when embodying the present invention, from the viewpoint of suppressing the looseness in the circumferential direction of the magnetostrictive sensor 4a with respect to the case 2a, it is preferable to sufficiently reduce or eliminate such a gap in the circumferential direction.

In this example, in a state where the magnetostrictive sensor 4 is internally fitted to and held by the inner circumferential surface 6 of the case 2, the coil 10 (detection part) is arranged closely adjacent to the intermediate shaft portion 8 (magnetostrictive effect part of the rotating shaft 3) so as to face each other in the radial direction over the entire circumference. In addition, a portion of the harness 16 is arranged inside the groove 19, specifically, inside a portion on the one side in the axial direction of the groove 19.

When the intermediate shaft portion 8 undergoes torsional deformation by applying a torque to the rotating shaft 3 and magnetic permeability in each direction of the intermediate shaft portion 8 changes, a magnetic flux passing through the inside of the coil 10 of the magnetostrictive sensor 4 changes, and thus the voltage of the coil 10 changes on the basis of change of the inductance of the coil 10. Therefore, a torque transmitted by the rotating shaft 3 can be measured by using the voltage of the coil 10.

When embodying the present invention, as the detection part of the magnetostrictive sensor, a magnetic detecting element such as a Hall element may also be used instead of the coil.

In this example, the torque measurement device 1 capable of preventing the magnetostrictive sensor 4 supported to the case 2 from rotating with respect to the case 2 is provided. That is, by engaging the convex portion 18 protruding from the portion in the circumferential direction of the magnetostrictive sensor 4 toward the outer side in the radial direction with the groove 19 which is a portion of the case 2, the magnetostrictive sensor 4 is positioned with respect to the case 2 in the rotation direction, and is prevented from rotating with respect to the case 2. Therefore, the position in the rotation direction of the coil 10 of the magnetostrictive sensor 4 with respect to the intermediate shaft portion 8 of the rotating shaft 3 can be properly regulated. From this aspect, the torque measurement error can be suppressed to be small.

In this example, the structure in which the magnetostrictive sensor 4 supported by the case 2 is prevented from rotating with respect to the case 2 can be achieved in a simple configure only by engaging the convex portion 18 protruding from the portion in the circumferential direction of the magnetostrictive sensor 4 toward the outer side in the radial direction with the groove 19 which is a portion of the case 2.

In this example, by internally fitting the main body 12 of the holder 9 to the inner circumferential surface 6 of the case 2 without looseness in the radial direction, the magnetostrictive sensor 4 is positioned with respect to the case 2 in the radial direction. Therefore, the position in the radial direction of the coil 10 of the magnetostrictive sensor 4 with respect to the intermediate shaft portion 8 of the rotating shaft 3 can be properly regulated. In other words, a gap which is a distance between the outer circumferential surface of the intermediate shaft portion 8 and the coil 10 facing each other can be properly controlled. From this aspect as well, the torque measurement error can be suppressed to be small.

In this example, the portion of the harness 16 is arranged inside the groove 19. Due to this, the structure of the case 2 can be simplified as compared to the case where a path in which the portion of the harness 16 is to be arranged is formed separately from the case 2.

FIRST EXAMPLE OF REFERENCE EXAMPLE

Figure 4:
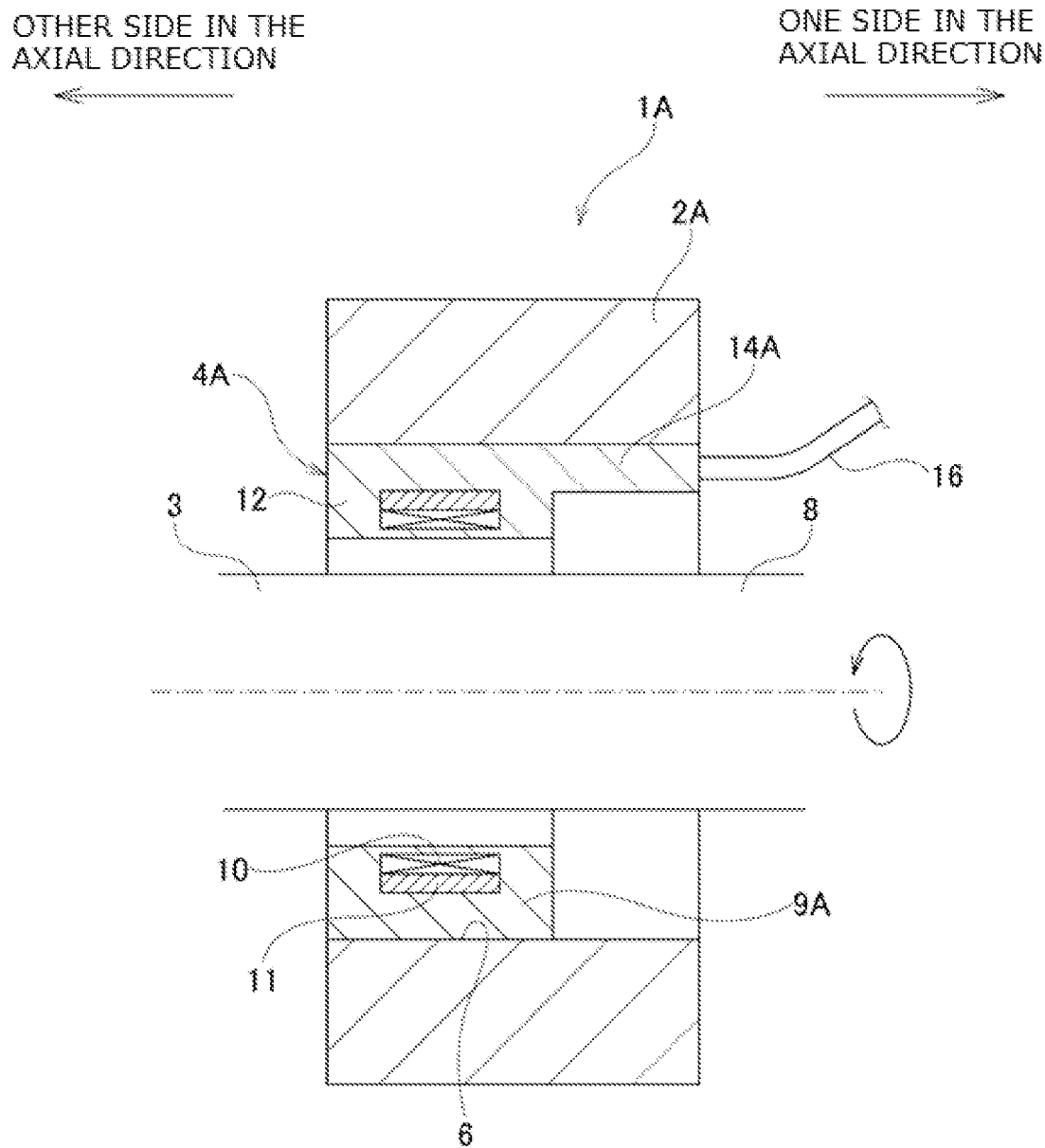
FIG. 4 is a cross-sectional view illustrating one example of a reference example related to the present invention.

FIG. 4 illustrates a first example of a reference example related to the present invention.

In a torque measurement device 1A of this reference example, the end portion of the harness 16 is connected to the side surface in the axial direction of a magnetostrictive sensor 4A.

Specifically, a holder 9A of the magnetostrictive sensor 4A includes the cylindrical main body 12 in which the coil 10 and the back yoke 11 are embedded, and a terminal portion 14A protruding from one position in the circumferential direction of the side surface on the one side in the axial direction of the main body 12 toward the one side in the axial direction. The end portion of the harness 16 is connected to the tip-end surface which is an end surface on the one side in the axial direction of the terminal portion 14A, which is a side surface in the axial direction of the magnetostrictive sensor 4A.

The main body 12 of the holder 9A of the magnetostrictive sensor 4A is internally fitted to the inner circumferential surface 6 of a case 2A without looseness in the radial direction.

In this reference example, the end portion of the harness 16 for obtaining the voltage signal of the coil 10 of the magnetostrictive sensor 4A is connected to the side surface in the axial direction of the magnetostrictive sensor 4A. Due to this, it is not necessary to provide the case 2A with a recess portion and the like in which the terminal portion 14A and the portion of the harness 16 are to be arranged. Therefore, the structure of the case 2A can be simplified. Furthermore, it is possible to easily attach the magnetostrictive sensor 4A to the case 2A. Other configurations and operational effects are the same as in the first example.

SECOND EXAMPLE

Figure 5:
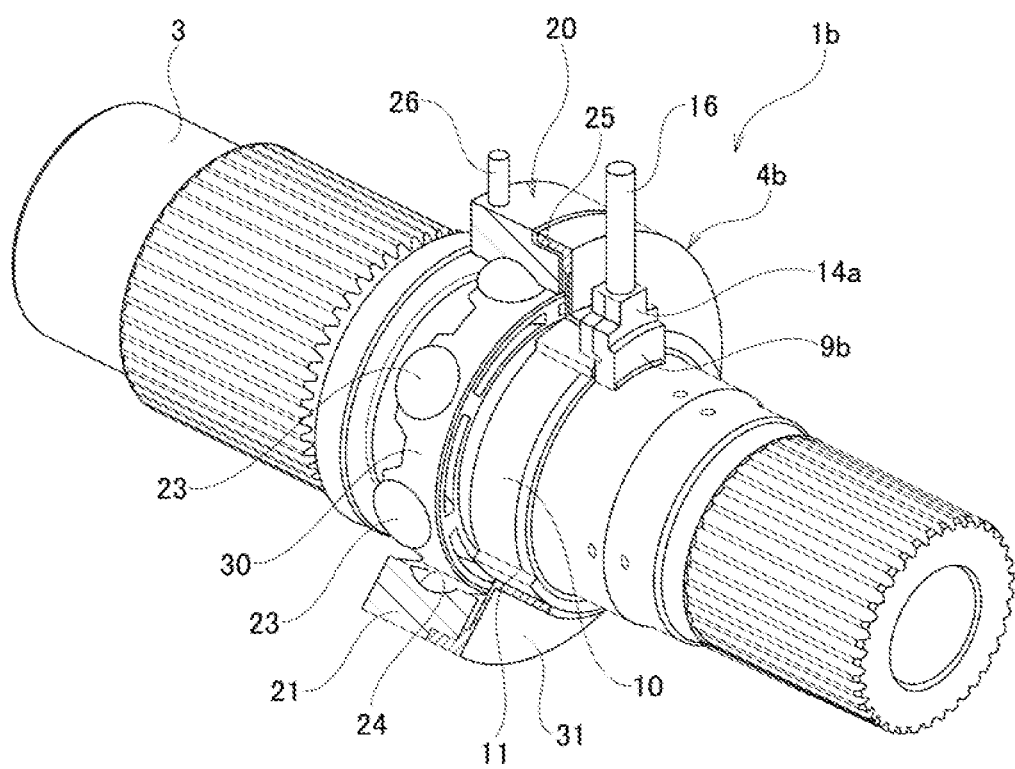
FIG. 5 is a perspective view illustrating a torque measurement device of a second example of an embodiment of the present invention, in which a case is omitted.
Figure 6:
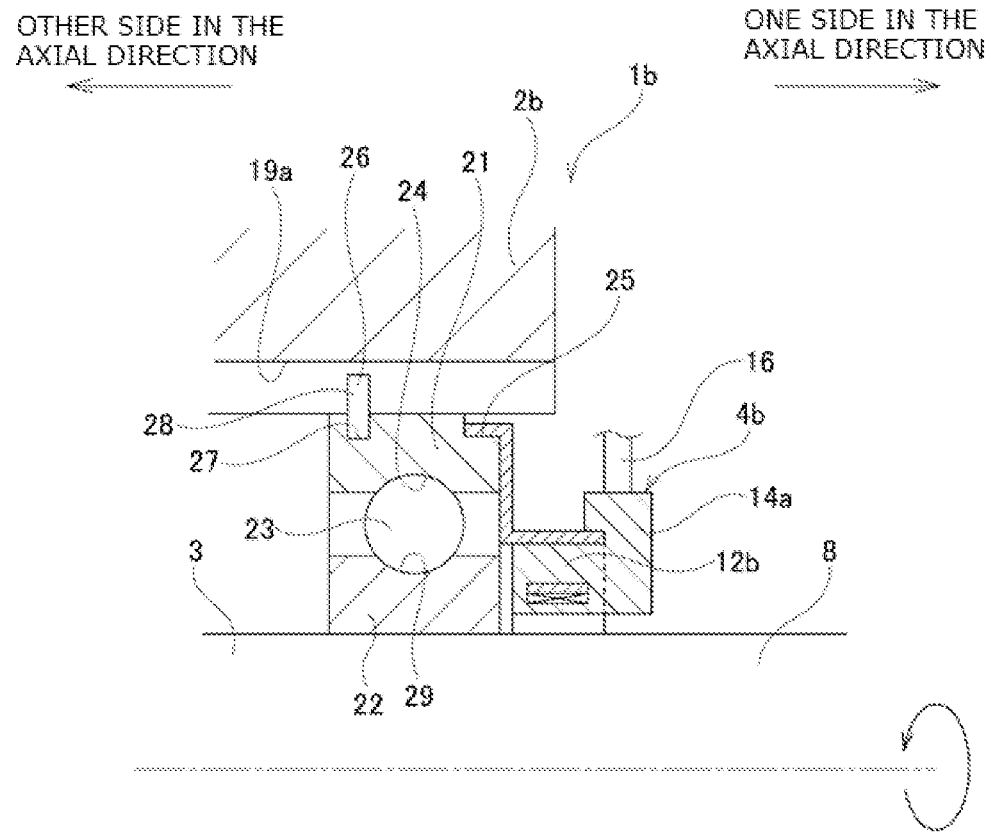
FIG. 6 is a cross-sectional view illustrating the torque measurement device of the second example.
Figure 6:
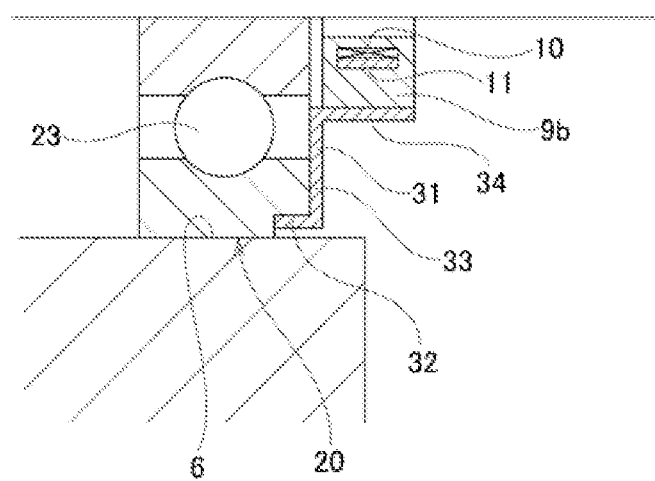

A second example of an embodiment of the present invention will be described with reference to FIGS. 5 and 6.

A torque measurement device 1b of this example includes, in addition to the case 2b, the rotating shaft 3, and a magnetostrictive sensor 4b, a rolling bearing 20 supporting the rotating shaft 3 so that the rotating shaft 3 is able to rotate freely with respect to the case 2b.

The rolling bearing 20 is arranged in the vicinity of the rotating shaft 3, and is constituted by including the outer ring 21 which is internally fitted to the case 2b. The magnetostrictive sensor 4b is supported to the case 2b by way of the outer ring 21. When embodying the present invention, as the rolling bearing, various types of rolling bearings such as a ball bearing, a roller bearing, a tapered roller bearing, and the like may be adopted.

In this example, the rotation-preventing construction for preventing the magnetostrictive sensor 4b from rotating with respect to the case 2b is constituted by engaging the convex portion 26 protruding from a portion in the circumferential direction of the outer ring 21 toward the outer side in the radial direction with a portion of the case 2b.

More specifically, in this example, the rolling bearing 20 is a deep-groove-type ball bearing, and includes the outer ring 21, an inner ring 22, and a plurality of balls 23 each of which is a rolling body.

The outer ring 21 has a deep-groove-type outer raceway 24 on the inner circumferential surface. The outer ring 21 has a small-diameter portion 25 in the end portion on the one side in the axial direction of the outer circumferential surface, the outer diameter of the small-diameter portion 25 being smaller than that of the adjacent portion on the other side in the axial direction. The outer ring 21 has the convex portion 26 protruding from the outer circumferential surface toward the outer side in the radial direction. Due to this, in this example, the inner side portion in the radial direction of a pin 28 made of metal is press-fitted into a recess portion 27 provided in one position in the circumferential direction of the end portion on the other side in the axial direction of the outer circumferential surface of the outer ring 21. Then, the convex portion 26 is configured by the outer-side portion in the radial direction of the pin 28.

The outer ring 21 is internally fitted to the inner circumferential surface 6 of the case 2b by loose fitting. In this state, the convex portion 26 engages with a groove 19a which is provided in one position in the circumferential direction of the inner circumferential surface 6 of the case 2b and extends in the axial direction. That is, in this example, the rotation-preventing construction is configured by engaging the convex portion 26 with the groove 19a which is a portion of the case 2b. Note that the rotation-preventing construction may also be configured by forming a through hole that passes through the case in the radial direction of the rolling bearing, and engaging the tip-end portion of the pin which is inserted into the through hole with a recess portion formed in the outer ring. In this case, the magnetostrictive sensor and the outer ring can be positioned with respect to the case in the axial direction, as well as are prevented from rotating with respect to the case.

The inner ring 22 has a deep-groove-type inner raceway 29 on the outer circumferential surface. The inner ring 22 is externally fitted to the intermediate shaft portion 8 of the rotating shaft 3 by interference fitting.

The plurality of balls 23 are arranged between the outer raceway 24 and the inner raceway 29 so as to be the able to roll freely in a state of being held by a retainer 30. Note that the retainer 30 is not illustrated in FIG. 6.

In this example, the magnetostrictive sensor 4b is attached to the outer ring 21 of the rolling bearing 20 so as to be integrated with the rolling bearing 20. The magnetostrictive sensor 4b includes a support ring 31, a holder 9b, a coil 10, and a back yoke 11.

The support ring 31 is made of a metal plate and is configured in an annular shape as a whole. The support ring 31 includes a fitting cylinder portion 32 having a cylindrical shape, a side plate portion 33 bent at right angles from the end portion on the one side in the axial direction of the fitting cylinder portion 32 toward the inner side in the radial direction and having a hollow-circular-plate-shape, and a supporting cylindrical portion 34 bent at right angles from the end portion on the inner side in the radial direction of the side plate portion 33 toward the one side in the axial direction and having a cylindrical shape. The fitting cylinder portion 32 is externally fitted to and fixed by the small-diameter portion 25 of the outer ring 21. The side surface on the other side in the axial direction of the outer-side portion in the radial direction of the side plate portion 33 is in contact with the side surface on the one side in the axial direction of the outer ring 21.

The holder 9b embeds the coil 10 and the back yoke 11, and includes a cylindrical main body 12b which is internally fitted to and fixed by the supporting cylindrical portion 34 of the support ring 31, and a terminal portion 14a which protrudes from one position in the circumferential direction of the main body 12b toward the one side in the axial direction and the outer side in the radial direction.

The coil 10 (detection part) is arranged closely adjacent to the intermediate shaft portion 8 (magnetostrictive effect part of the rotating shaft 3) so as to face each other in the radial direction over the entire circumference. The end portion of the harness 16 is connected to the tip-end surface which is an end surface on the outer side in the radial direction of the terminal portion 14a.

In the structure of this example, the magnetostrictive sensor 4b is integrated with the rolling bearing 20. Due to this, it is possible to easily assemble the torque measurement device 1b, and to arrange the magnetostrictive sensor 4b in a small space.

The magnetostrictive sensor 4b is supported to the case 2b by way of the outer ring 21 which is internally fitted to the case 2b. Due to this, a gap which is a distance between the coil 10 (detection part) and the outer circumferential surface of the intermediate shaft portion 8 (magnetostrictive effect part) facing each other can be properly controlled. From this aspect, it becomes easy to secure the torque measurement accuracy.

In the structure of this example, the rotation-preventing construction, which is constituted by engaging the convex portion 26 with the groove 19a, prevents both rotation of the outer ring 21 with respect to the case 2b and rotation of the magnetostrictive sensor 4b with respect to the case 2b. Due to this, it is possible to avoid occurrence of inconvenience such that the harness 16 is pulled by rotation, that is, creeping of the outer ring 21 with respect to the case 2b. Other configurations and operational effects are the same as in the first example.

THIRD EXAMPLE

Figure 7:
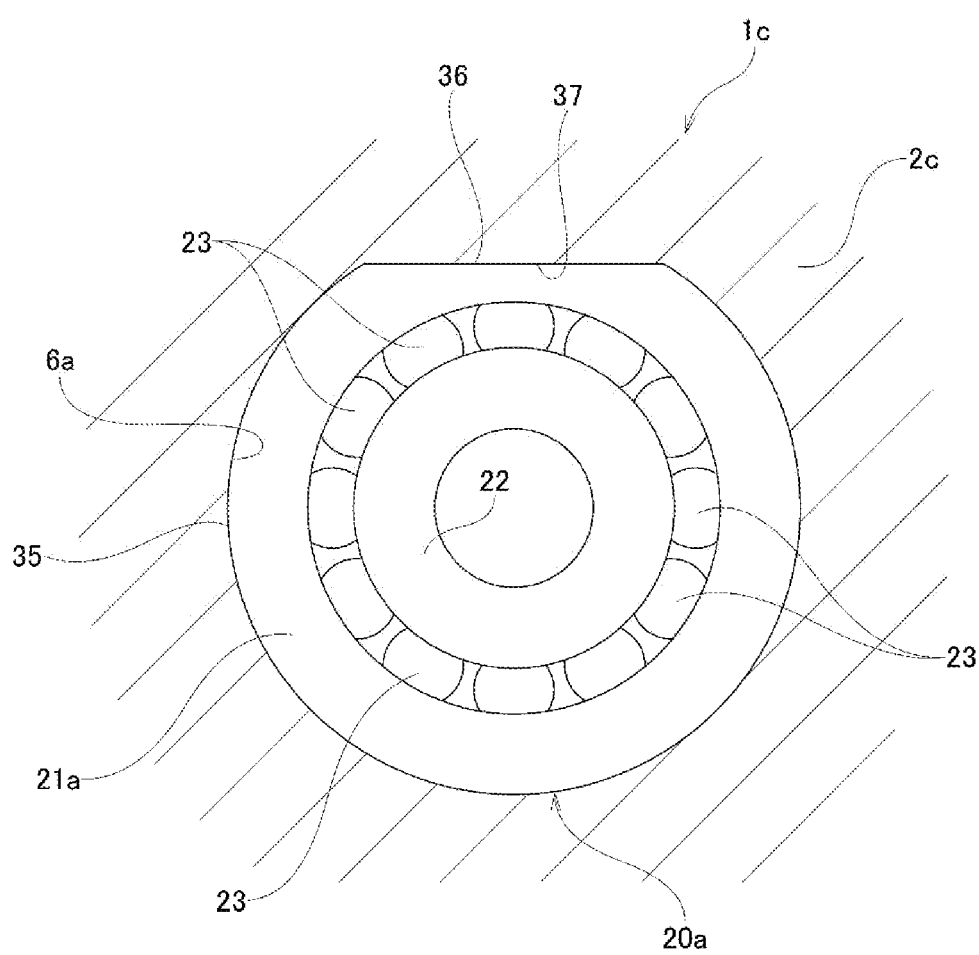
FIG. 7 is a partial cross-sectional view of a torque measurement device of a third example of an embodiment of the present invention, in which a rotating shaft is omitted, as viewed from the other side in the axial direction.

A third example of an embodiment of the present invention will be described with reference to FIG. 7.

In a torque measurement device 1c of this example, similar to the torque measurement device 1b of the second example, the magnetostrictive sensor configured in an annular shape as a whole is attached to the end portion on the one side in the axial direction of an outer ring 21a of a rolling bearing 20a. FIG. 7 is a partial cross-sectional view of the torque measurement device 1c of this example, in which the rotating shaft is omitted, as viewed from the other side in the axial direction.

In the torque measurement device 1c of this example, the rotation-preventing construction for preventing the magnetostrictive sensor from rotating with respect to a case 2c is constituted by fitting the outer circumferential surface 35 of the outer ring 21a to an inner circumferential surface 6a of the case 2c by non-circular fitting.

Therefore, in a state where the outer circumferential surface 35 of the outer ring 21a is fitted to the inner circumferential surface 6a of the case 2c, a plane surface portion 36 provided on a portion in the circumferential direction of the outer circumferential surface 35 of the outer ring 21a is in surface contact with a plane surface portion 37 provided on a portion in the circumferential direction of the inner circumferential surface 6a of the case 2c. When embodying the present invention, as the non-circular fitting, for example, fitting of the outer circumferential surface and the inner circumferential surface each of which has a polygonal cross-sectional shape, serration fitting, and the like, can be adopted. Other configurations and operational effects are the same as in the second example.

FOURTH EXAMPLE

Figure 8:
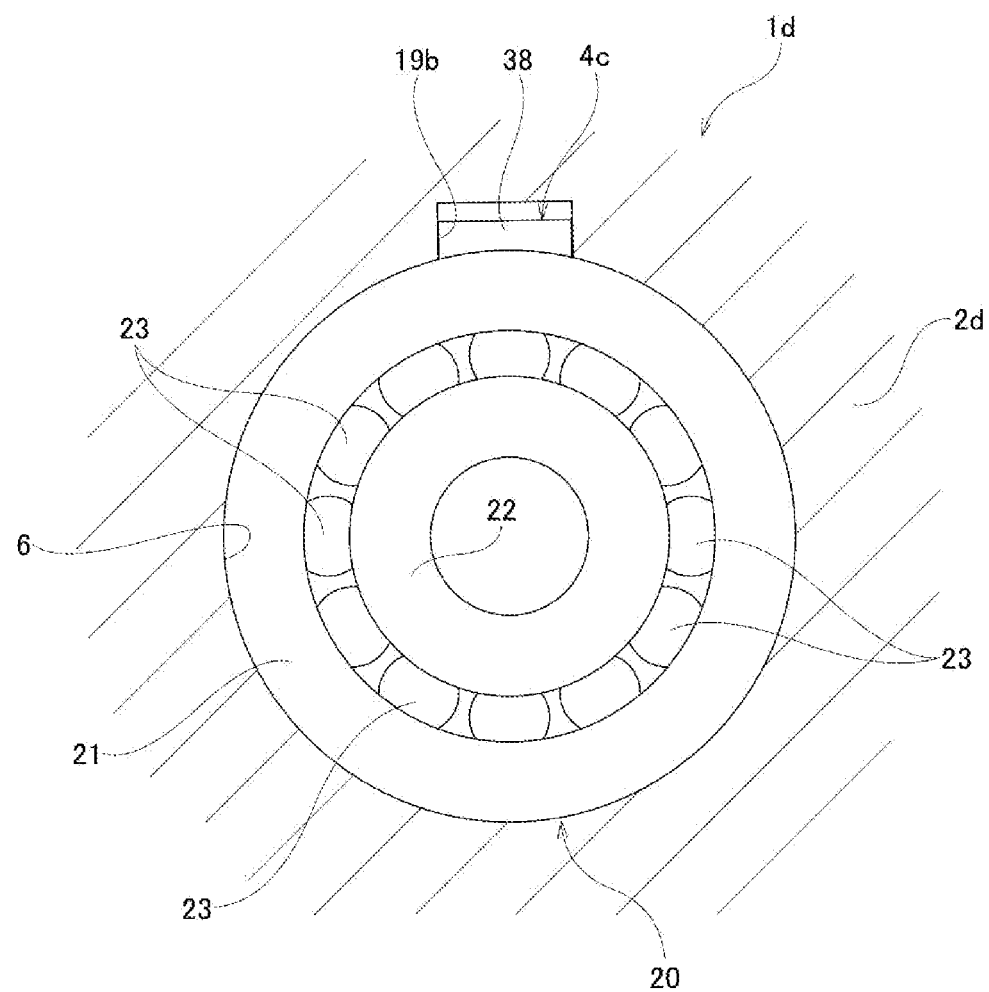
FIG. 8 is a partial cross-sectional view of a torque measurement device of a fourth example of an embodiment of the present invention, in which a rotating shaft is omitted, as viewed from the other side in the axial direction.

A fourth example of an embodiment of the present invention will be described with reference to FIG. 8.

In a torque measurement device 1d of this example, similar to the torque measurement device 1b of the second example, a magnetostrictive sensor 4c configured in an annular shape as a whole is attached to the end portion on the one side in the axial direction of the outer ring 21 of the rolling bearing 20. FIG. 8 is a partial cross-sectional view of the torque measurement device 1d of this example, in which the rotating shaft is omitted, as viewed from the other side in the axial direction.

In the torque measurement device 1d of this example, the rotation-preventing construction for preventing the magnetostrictive sensor 4c from rotating with respect to a case 2d is constituted by engaging the convex portion 38 protruding from a portion in the circumferential direction of the magnetostrictive sensor 4c toward the outer side in the radial direction with a portion of the case 2d.

Specifically, the rotation-preventing construction is constituted by engaging the convex portion 38, which is provided in a portion in the circumferential direction of the magnetostrictive sensor 4c and protrudes from the outer circumferential surface of the outer ring 21 toward the outer side in the radial direction, with a groove 19b which is provided in one position in the circumferential direction of the inner circumferential surface 6 of the case 2d and extends in the axial direction. Other configurations and effects are the same as in the second example.

FIFTH EXAMPLE

Figure 9:
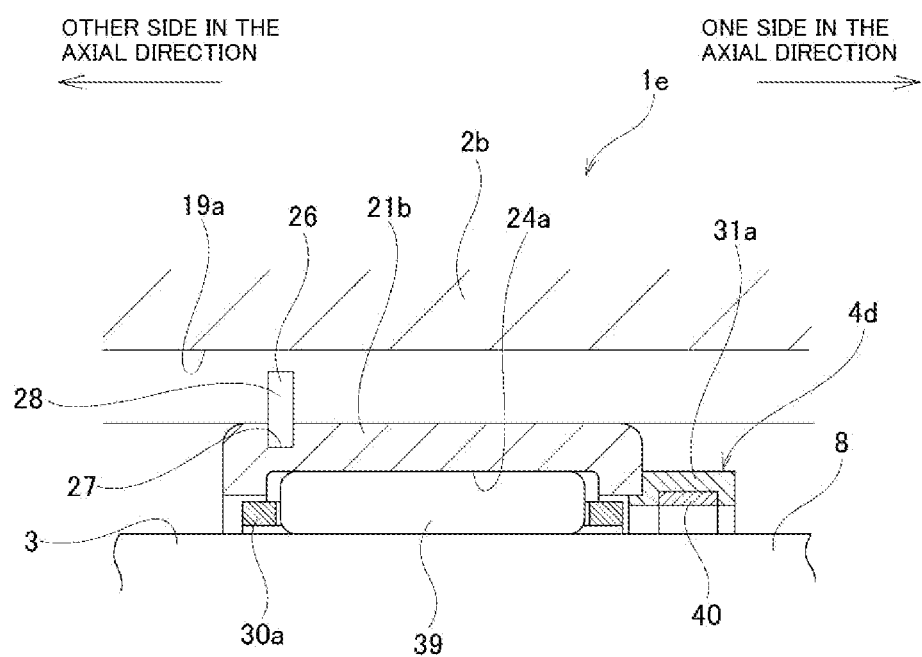
FIG. 9 is a cross-sectional view of a torque measurement device of a fifth example of an embodiment of the present invention.
Figure 9:
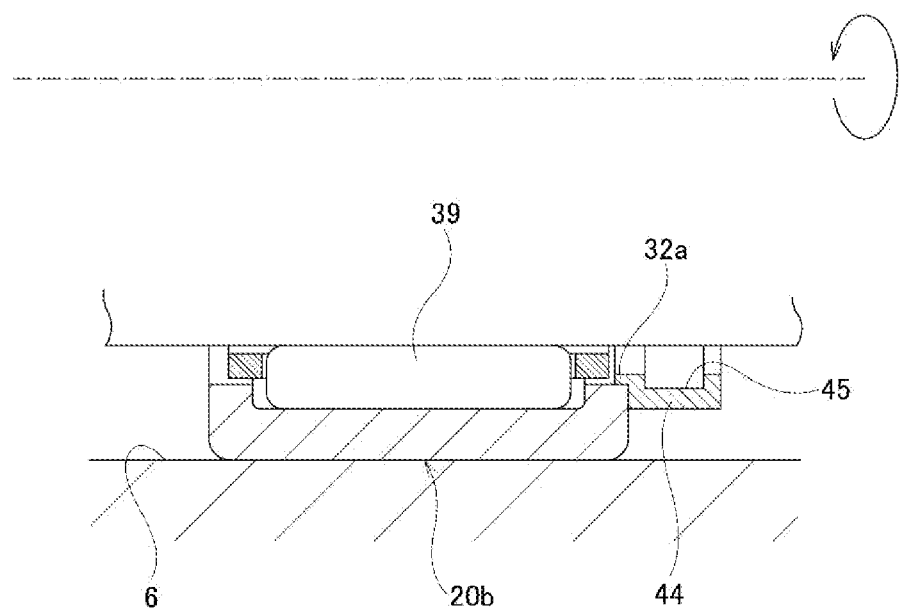

A fifth example of an embodiment of the present invention will be described with reference to FIG. 9.

In a torque measurement device 1e of this example, a rolling bearing 20b supporting the rotating shaft 3 so that the rotating shaft 3 is able to rotate freely with respect to the case 2b is a needle bearing, and includes an outer ring 21b, and a plurality of needles 39 each of which is a rolling body. The outer ring 21b has an outer raceway 24a, which is configured by a cylindrical surface, on the inner circumferential surface of the intermediate portion in the axial direction. The plurality of needles 39 are arranged between the outer raceway 24a and the outer circumferential surface of the intermediate shaft portion 8 of the rotating shaft 3 so as to be able to roll freely in a state of being held by the retainer 30a.

In this example, the magnetostrictive sensor 4d includes a support ring 31a which is supported and fixed by an end portion on the one side in the axial direction of the outer ring 21b, and a magnetic detecting element 40 (detection part) such as a Hall element which is held and fixed by the support ring 31a.

The support ring 31a is made of metal and is configured in an annular shape as a whole. The support ring 31a includes a fitting cylinder portion 32a which is internally fitted to the end portion on the one side in the axial direction of the outer ring 21b by interference fitting, and a support portion 44 having an annular shape and joined to the end portion on the one side in the axial direction of the fitting cylinder portion 32a, and whose side surface on the other side in the axial direction is in contact with the side surface on the one side in the axial direction of the outer ring 21b. The support portion 44 has a recess portion 45 that opens only to the inner side in the radial direction and continues over the entire circumference.

The magnetic detecting element 40 is held and fixed by one position in the circumferential direction inside the recess portion 45 of the support ring 31a. In this state, the magnetic detecting element 40 is arranged closely adjacent to the outer circumferential surface of the intermediate shaft portion 8 (magnetostrictive effect part of the rotating shaft 3).

The intermediate shaft portion 8 of the rotating shaft 3 is made magnetic, that is, magnetized in the circumferential direction.

In the structure of this example as well, when a torque is applied to the rotating shaft 3, the intermediate shaft portion 8 undergoes torsional deformation, and thus magnetic permeability of the intermediate shaft portion 8 changes due to a reverse magnetostrictive effect. Specifically, the intermediate shaft portion 8 receives a tensile stress in a direction of 45 degrees with respect to the axial direction and a compressive stress in a direction of −45 degrees with respect to the axial direction. Accompanying this, magnetic permeability in each direction of the intermediate shaft portion 8 changes due to a reverse magnetostrictive effect. In this example, due to such change of the magnetic permeability, magnetization of the intermediate shaft portion 8 is inclined from the circumferential direction toward the axial direction. As a result, a leakage magnetic flux is generated in the outer portion of the intermediate shaft portion 8, and when this leakage magnetic flux passes through the magnetic detecting element 40, the voltage of the magnetic detecting element 40 changes. Therefore, a torque transmitted by the rotating shaft 3 can be measured by using the voltage of the magnetic detecting element 40. Other configurations and operational effects are the same as in the second example.

SIXTH EXAMPLE

Figure 10:
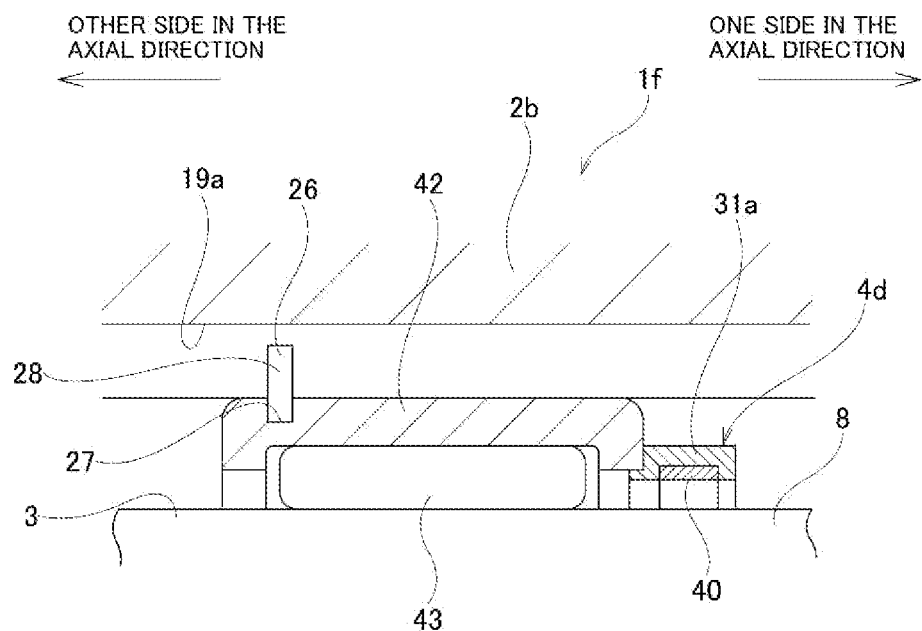
FIG. 10 is a cross-sectional view of a torque measurement device of a sixth example of an embodiment of the present invention.

A sixth example of an embodiment of the present invention will be described with reference to FIG. 10.

A torque measurement device 1*f* of this example includes, in addition to the case 2*b*, the rotating shaft 3, and the magnetostrictive sensor 4*d*, a one-way clutch 41 for allowing rotation of the rotating shaft 3 with respect to the case 2 in a specified direction, and preventing rotation of the rotating shaft 3 with respect to the case 2 in an opposite direction to the specified direction. In the structure of this example as well, the rotating shaft 3 is arranged coaxially with the inner circumferential surface 6 of the case 2*b*, and is rotatably supported to the case 2*b* by way of the rolling bearing (not shown).

The one-way clutch 41 is arranged in the vicinity of the rotating shaft 3 and is constituted by including an outer ring 42 which is internally fitted to the case 2*b*. The magnetostrictive sensor 4*d* is supported to the case 2*b* by way of the outer ring 42. In this example, the rotation-preventing construction for preventing the magnetostrictive sensor 4*d* from rotating with respect to the case 2*b* is constituted by engaging the convex portion 26 protruding from a portion in the circumferential direction of the outer ring 42 toward the outer side in the radial direction with a portion of the case 2*b*.

More specifically, in this example, the one-way clutch 41 includes the outer ring 42, a plurality of engaging elements 43, and a retainer and a bias spring (not shown). The outer ring 42 is internally fitted to the inner circumferential surface 6 of the case 2*b* by interference fitting. Each of the plurality of engaging elements 43 is configured by a sprag. The plurality of engaging elements 43 are arranged between the inner circumferential surface of the intermediate portion in the axial direction of the outer ring 42 and the outer circumferential surface of the intermediate shaft portion 8 of the rotating shaft 3, both of which are cylindrical surfaces. The retainer holds the plurality of engaging elements 43. The bias spring is locked by the retainer so as to elastically press each of the engaging elements 43 in a direction in which each of the engaging elements 43 engages with the inner circumferential surface of the intermediate portion in the axial direction of the outer ring 42 and the outer circumferential surface of the intermediate shaft portion 8. Note that each of the engaging elements can be configured by a roller. In a case where each of the engaging elements is configured by a roller, the inner circumferential surface of the intermediate portion in the axial direction of the outer ring is configured by a cam surface which is a concave and convex surface with respect to the circumferential direction.

When the rotating shaft 3 tends to rotate with respect to the case 2*b* in a specified direction, engagement of the plurality of engaging elements 43 with the inner circumferential surface of the intermediate portion in the axial direction of the outer ring 42 and the outer circumferential surface of the intermediate shaft portion 8 is released, thereby allowing rotation of the rotating shaft 3 with respect to the case 2*b*. On the other hand, when the rotating shaft 3 tends to rotate with respect to the case 2*b* in an opposite direction to the specified direction, the plurality of engaging elements 43 engage with the inner circumferential surface of the intermediate portion in the axial direction of the outer ring 42 and the outer circumferential surface of the intermediate shaft portion 8, thereby preventing rotation of the rotating shaft 3 with respect to the case 2*b*.

In this example, the outer ring 42 has the convex portion 26 protruding from the outer circumferential surface toward the outer side in the radial direction. Due to this, the inner side portion in the radial direction of a pin 28 made of metal is press-fitted into a recess portion 27 provided in one position in the circumferential direction of the end portion on the other side in the axial direction of the outer circumferential surface of the outer ring 42. The outer-side portion in the radial direction of the pin 28 constitutes the convex portion 26.

In a state where the outer ring 42 is internally fitted to the inner circumferential surface 6 of the case 2*b* by interference fitting, the convex portion 26 engages with a groove 19*a* that is provided in one position in the circumferential direction of the inner circumferential surface 6 of the case 2*b* and extends in the axial direction. That is, in this example, the rotation-preventing construction is constituted by engaging the convex portion 26 with the groove 19*a* which is a portion of the case 2*b*.

In this example, the magnetostrictive sensor 4*d* is attached to the outer ring 42 of the one-way clutch 41, thereby being integrated with the one-way clutch 41. The magnetostrictive sensor 4*d* includes a support ring 31*a* which is supported and fixed by the end portion on the one side in the axial direction of the outer ring 42, and a magnetic detecting element 40 (detection part) such as a Hall element which is held and fixed by the support ring 31*a*.

The support ring 31*a* is made of metal, and is configured in an annular shape as a whole. The support ring 31*a* includes a fitting cylinder portion 32*a* which is internally fitted to the end portion on the one side in the axial direction of the outer ring 42 by interference fitting, and a support portion 44 having an annular shape and joined to the end portion on the one side in the axial direction of the fitting cylinder portion 32*a*, and whose side surface on the other side in the axial direction is in contact with the side surface on the one side in the axial direction of the outer ring 42. The support portion 44 has a recess portion 45 that opens only to the inner side in the radial direction and continues over the entire circumference.

The magnetic detecting element 40 is held and fixed by one position in the circumferential direction inside the recess portion 45 of the support ring 31*a*. In this state, the magnetic detecting element 40 is arranged closely adjacent to the outer circumferential surface of the intermediate shaft portion 8 (magnetostrictive effect part of the rotating shaft 3). In addition, the intermediate shaft portion 8 of the rotating shaft 3 is made magnetic, that is, magnetized in the circumferential direction.

In the structure of this example, the magnetostrictive sensor 4*d* is integrated with the one-way clutch 41. Due to this, it is possible to easily assemble the torque measurement device 1*f*, and to arrange the magnetostrictive sensor 4*d* in a small space.

The magnetostrictive sensor 4*d* is supported to the case 2*b* by way of the outer ring 42 which is internally fitted to the case 2*b*. Due to this, a gap which is a distance between the magnetic detecting element 40 (detection part) and the outer circumferential surface of the intermediate shaft portion 8 (magnetostrictive effect part) facing each other can be properly controlled. From this aspect, it becomes easy to secure the torque measurement accuracy.

In the structure of this example, the rotation-preventing construction, which is constituted by engaging the convex portion 26 with the groove 19*a*, prevents both rotation of the outer ring 42 with respect to the case 2*b* and rotation of the magnetostrictive sensor 4*d* with respect to the case 2*b*. Due to this, it is possible to avoid occurrence of inconvenience such that the harness (not shown), which is connected to the magnetostrictive sensor 4*d*, is pulled by rotation, that is, creeping of the outer ring 42 with respect to the case 2*b*. Other configurations and operational effects are the same as in the first example.

SEVENTH EXAMPLE

Figure 11:
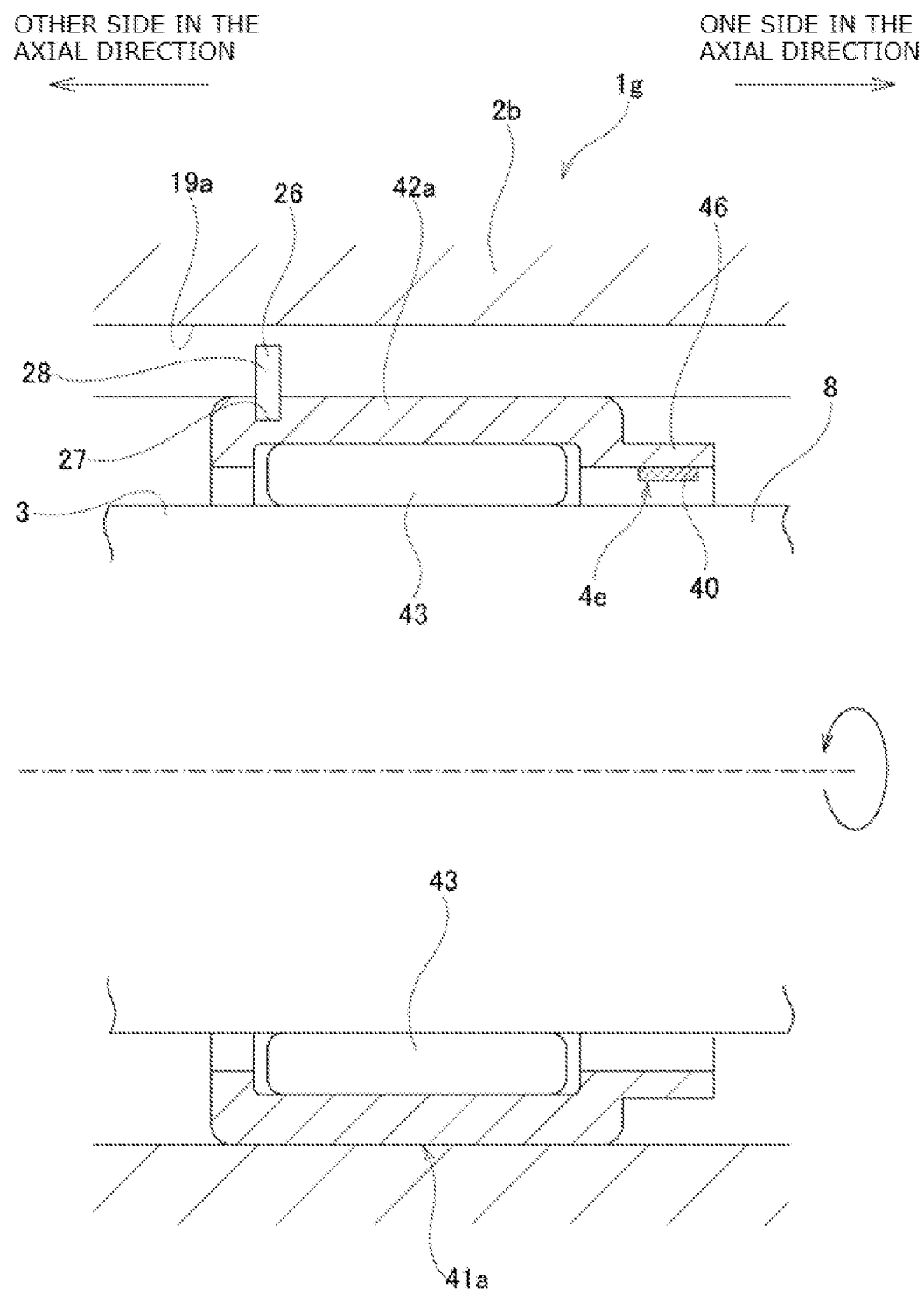
FIG. 11 is a cross-sectional view of a torque measurement device of a seventh example of an embodiment of the present invention.

A seventh example of an embodiment of the present invention will be described with reference to FIG. 11.

In a torque measurement device 1*g* of this example, an outer ring 42*a* of a one-way clutch 41*a* includes a support portion 46 having a cylindrical shape in the end portion on the one side in the axial direction, the outer diameter of the support portion 46 being smaller than that of the adjacent portion on the other side in the axial direction. When embodying the present invention, the outer diameter of the support portion may also be equal to that of the adjacent portion on the other side in the axial direction.

In this example, a magnetostrictive sensor 4*e* including the magnetic detecting element 40 (detection part) is supported by the inside surface in the radial direction of the support portion 46. Other configurations and operational effects are the same as in the sixth example.

The structure of each of the embodiments and the reference example described above may be implemented in appropriate combination as long as no contradiction occurs.

REFERENCE SIGNS LIST

1, 1*b*, 1*c*, 1*d*, 1*e*, 1*f*, 1*g*, 1A Torque measurement device
2, 2*b*, 2*c*, 2*d*, 2A Case
3 Rotating shaft
4, 4*b*, 4*c*, 4*d*, 4*e*, 4A Magnetostrictive sensor
6, 6*a* Inner circumferential surface
8 Intermediate shaft portion
9, 9*b*, 9A Holder
10 Coil
11 Back yoke
12, 12*b* Main body
14*a*, 14A Terminal portion
16 Harness
18 Convex portion
19, 19*a*, 19*b* Groove
20, 20*a*, 20*b* Rolling bearing
21, 21*a*, 21*b* Outer ring
22 Inner ring
23 Ball
24, 24*a* Outer raceway
25 Small-diameter portion
26 Convex portion
27 Recess portion
28 Pin
29 Inner raceway
30, 30*a* Retainer
31, 31*a* Support ring
32, 32*a* Fitting cylinder portion
33 Side plate portion
34 Supporting cylindrical portion
35 Outer circumferential surface
36 Plane surface portion
37 Plane surface portion
38 Convex portion
39 Needle
40 Magnetic detecting element
41, 41*a* One-way clutch
42, 42*a* Outer ring
43 Engaging element
44 Support portion
45 Recess portion
46 Support portion

The invention claimed is:

1. A torque measurement device comprising:
a case that does not rotate even during use;
a rotating shaft rotatably supported to the case and having a magnetostrictive effect part whose magnetic permeability changes according to a transmitted torque;
a magnetostrictive sensor having a detection part arranged closely adjacent to the magnetostrictive effect part so that a voltage changes according to change of the magnetic permeability of the magnetostrictive effect part, and the magnetostrictive sensor being supported to the case;
an outer ring arranged in a vicinity of the rotating shaft and internally fitted to the case; and
a rolling bearing that is constituted by including the outer ring, and supports the rotating shaft so that the rotating shaft is able to rotate freely with respect to the case,
wherein
the torque measurement device has a rotation-preventing construction configured to prevent the outer ring from rotating with respect to the case,
and
the magnetostrictive sensor is supported to the outer ring.

2. The torque measurement device according to claim 1, wherein
the rotation-preventing construction is constituted by engaging a convex portion protruding from a portion in a circumferential direction of the outer ring toward an outer side in a radial direction with a portion of the case.

3. The torque measurement device according to claim 1, wherein
the rotation-preventing construction is constituted by fitting an outer circumferential surface of the outer ring to an inner circumferential surface of the case by non-circular fitting.

4. The torque measurement device according to claim 1, wherein
the rotation-preventing construction is constituted by engaging a convex portion protruding from a portion in a circumferential direction of the magnetostrictive sensor toward an outer side in a radial direction with a portion of the case.

5. A torque measurement device comprising:
a case that does not rotate even during use;
a rotating shaft rotatably supported to the case and having a magnetostrictive effect part whose magnetic permeability changes according to a transmitted torque;
a magnetostrictive sensor having a detection part arranged closely adjacent to the magnetostrictive effect part so that a voltage changes according to change of the magnetic permeability of the magnetostrictive effect part, and the magnetostrictive sensor being supported to the case; and
an outer ring arranged in a vicinity of the rotating shaft and internally fitted to the case;
wherein
the torque measurement device has a rotation-preventing construction configured to prevent the magnetostrictive sensor from rotating with respect to the case,
the magnetostrictive sensor is supported to the case by way of the outer ring, and
a one-way clutch that is constituted by including the outer ring, and is configured to allow rotation of the rotating shaft with respect to the case in a specified direction, and prevent rotation of the rotating shaft with respect to the case in an opposite direction to the specified direction.

6. A torque measurement device comprising:
a case that does not rotate even during use;
a rotating shaft rotatably supported to the case and having a magnetostrictive effect part whose magnetic permeability changes according to a transmitted torque;
a magnetostrictive sensor having a detection part arranged closely adjacent to the magnetostrictive effect part so that a voltage changes according to change of the magnetic permeability of the magnetostrictive effect part, and the magnetostrictive sensor being supported to the case; and
an outer ring arranged in a vicinity of the rotating shaft and internally fitted to the case;
wherein
the torque measurement device has a rotation-preventing construction configured to prevent the magnetostrictive sensor from rotating with respect to the case,
the magnetostrictive sensor is supported to the case by way of the outer ring,
the rotation-preventing construction is constituted by engaging a convex portion protruding from a portion in a circumferential direction of the magnetostrictive sensor toward an outer side in a radial direction with a portion of the case,
the portion of the case is a groove provided in an inner circumferential surface of the case and extending in an axial direction, and
an end portion of a harness is connected to a side surface in the axial direction of the convex portion and a portion of the harness is arranged inside the groove.

* * * * *